United States Patent Office 3,240,714
Patented Mar. 15, 1966

3,240,714
ACIDIC COMPOSITIONS NON-CORROSIVE
TO METAL SURFACES
Charanjit Rai, Crystal Lake, Ill., assignor, by mesne assignments, to Union Oil Company of California, Los Angeles, Calif., a corporation of California
No Drawing. Filed July 24, 1963, Ser. No. 297,206
6 Claims. (Cl. 252—148)

This invention relates to the discovery that $\alpha,\omega$-bis(2-benzothiazolyl) -alkanes, -arylenes, or -polyalkanols, or $\alpha,\omega$-bis(2-benzimidazolyl)-alkanes, -arylenes or -polyalkanols inhibit the corrosion of metal, such as ferrous metals, in acidic media, such as acidic solutions including aqueous mineral acid solutions. The invention is based on the discovery that the aforenamed compounds, particularly such species as 1,4-bis(2-benzimidazolyl)butane and 1,2-bis-(2-benzothiazolyl)ethane-1,2-diol compare favorably in their abilities to protect metal surfaces against corrosion under the conditions of the standard "Static Corrosion Test" with the best known inhibitors for acid media such as the alkylpyridines. The invention also relates to the method of inhibiting the corrosion of metals in acid media by incorporating at least about 0.01 wt. percent of the aforesaid compounds. The invention also relates to non-corrosive aqueous acid compositions containing effective amounts of the compounds of this invention. These and other discoveries and objectives of this invention will be described or become apparent as the specification proceeds.

The corrosion inhibitors of this invention are represented by compounds of the formula (I) 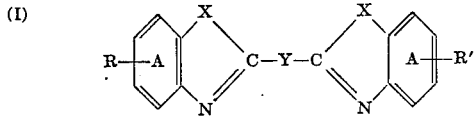

wherein R and R' are the same or different substituents of the group consisting of hydrogen, alkyl radicals of 1 to 20 carbon atoms, alkoxy radicals of 1 to 20 carbon atoms, and aryloxy radicals having 6 to 14 cyclic carbon atoms; X is sulfur or imino

is a divalent polyalkanol group of the formula $$-(CHOH)_n-$$

where $n$ is 1 to 10, or a divalent alkylene group of 1 to 20 carbon atoms, or a divalent arylene group of 6 to 14 cyclic carbon atoms; and

represents an aryl group of 6 to 14 cyclic carbon atoms.
When X is sulfur,

is phenylene and Y is polyalkanol, the sub-genus of compounds, namely $\alpha,\omega$-bis(2-benzothiazolyl)-polyalkanols is defined, having the formula (2) 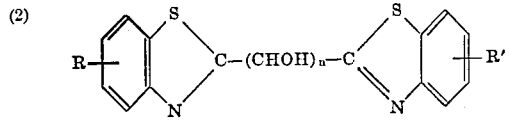

wherein R, R' and $n$ are as previously defined.
When X is sulfur,

is phenylene and Y is a divalent alkylene group of 1 to 20 carbon atoms, the subgenus of $\alpha,\omega$-bis(2-benzothiazolyl)-alkanes is defined, having the formula (3) 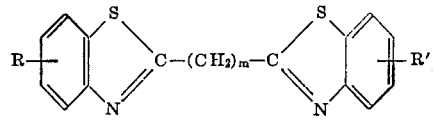

wherein R and R' are as previously defined and $m$ has a value of 1 to 20.
When X is sulfur,

is phenylene, and Y is arylene of 6 carbon atoms, the sub-genus of $\alpha,\omega$-bis(2-benzothiaxolyl)phenylene is defined, of the formula (4) 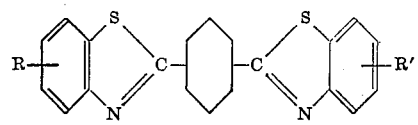

wherein R and R' are as previously defined and the relative position of the benzothiazolyl group attached to the phenylene group can be ortho, meta or para.

Where X in each of the subgeneric Formulae 2, 3, 4 is imino the corresponding $\alpha,\omega$-bis(2-benzimidazolyl)-polyalkanols (from Formula 2) and $\alpha,\omega$-bis(2-benzimidazolyl)phenylenes (from Formula 4) are defined.

This invention is related to a series of copending patent applications based on bisbenzothiazolyl derivatives as corrosion inhibitors in particular environments; namely, Serial No. 151,189, Nov. 9, 1961, and Serial No. 211,884, July 23, 1962, by Messrs. W. E. Kramer, R. C. Kimble, J. B. Braunwarth and the instant inventor. In copending application Serial No. 151,189 there is disclosed the discovery that the bisbenzothiazolyl polyhydroxy alkanes; that is, compounds of Formula 2 herein, act as corrosion inhibitors for copper or copper-containing alloys in aerated aqueous detergent media. Application Serial No. 211,884 by Messrs. W. E. Kramer, R. C. Kimble and the instant inventor, discloses that the bisbenzimidazolyl alkanes of Formula 3 herein, when used in amounts of from 0.0001 to 0.2 g./100 ml. of solution in aerated aqueous detergent media, inhibit the corrosion of copper or copper-containing alloys. These copending applications also disclose the manner of preparing these compounds.

The corrosive environments and the metal to be protected in said copending applications differ markedly from the corrosive environment and metal to be protected in accordance with this invention. As is known in the art, the protection of metals from the action of alkaline detergent solutions, particularly the protection of copper and its alloys from the corrosive action of commercial sulfonate detergent preparations wherein the corrosion-promoting ingredient is an alkali metal polyphosphate, containing or not containing alkali metal sulfates, represents a peculiar problem, as does the protection of ferrous metals from the corrosive action of acidic media, with which the instant invention is concerned. Even among preferred inhibitors of a given class there is considerable difference in ability to inhibit corrosion in a given environment, and the problem of finding an inhibitor which is as effective as the well-known and widely used amino or pyridinyl compounds for acid media is acute.

The following are selected species of compounds that are illustrative of the instant invention:

1,4-bis(2-benzimidazolyl)butane
1,1-bis(2-benzimidazolyl)methane
1,20-bis(2-benzimidazolyl)eicosane
1,5-bis(2-benzimidazolyl)pentane
1,2-bis(2-benzothiazolyl)ethane-1,2-diol
1,3-bis(2-benzothiazolyl)propane-1,2,3-triol
1,4-bis(2-benzothiazolyl)butane-1,2,3,4-tetrol
1,2-bis(2-benzimidazolyl)phenylene
1,3-bis(2-benzimidazolyl)phenylene
1,4-bis(2-benzimidazolyl)phenylene
1,8-bis(2-benzimidazolyl)anthrylene In order to demonstrate the invention the following experiments are presented.

Example 1

The effectiveness of the inhibitors of this invention was tested by a standard test known as the "Static Corrosion Test." In this test, a mild steel corrosion coupon is allowed to stand in a 10% aqueous hydrochloric acid solution for six days. The solution contains dissolved oxygen and is maintained at room temperature for the duration of the test. At the conclusion of the test the extent of corrosion is measured.

A series of tests was conducted following the above routine. The results are tabulated below:

| Additive | Concentration (wt. percent) | Corrosion Rate (inches per year) |
| --- | --- | --- |
| None | | 0.137 |
| 1,4-bis(2-benzimidazolyl)butane | 0.1 | 0.017 |
| 1,2-bis(2-benzothiazolyl)ethane-1,2-diol | 0.1 | 0.006 |
| Alkylpyridine HB | 0.2 | 0.0026 |

The above results show that the inhibitors of this invention compare favorably with alkylpyridines, which are among the best corrosion inhibitors known for acid media.

The inhibitors of this invention find utility in reducing the corrosion of ferrous metals in any acid media. By ferrous metals is meant such materials as cast iron, steel, alloys containing iron and the like. The acid medium may be any liquid or gaseous medium of an acid nature which is corrosive to ferrous metals. The acid component in the liquid or gaseous medium may be organic acid or an inorganic or mineral acid. The organic acids which are corrosive to ferrous metals are generally of low molecular weight, such as acetic acid, benzoic acid and the like, to include acids which contain a group such as a halogen which functions to increase the activity of the hydrogen ion on the carboxyl group of the acids. Such acids include mono-, di-, and trichloro acetic acid, the corresponding chloro, bromo, and iodo acids having 1 to 5 carbon atoms in the alkyl portion of the acid, and related acids. The mineral or inorganic acid may be any of the commonly known acids such as sulfuric, hydrochloric, hydrobromic, hydroiodic, hydrofluoric, nitric, phosphoric, polyphosphoric, boric and related mineral acids. Mixtures of organic acids, or mixtures of inorganic acids and mixtures of both organic and inorganic acids constitute the corrosive medium.

The amount of said corrosive acid in the corrosive medium is subject to variation depending on the nature of the ferrous metal in contact therewith. Under some circumstances, small concentrations in the order of .01 weight percent or volume percent may be exceedingly corrosive, particularly in the vapor state under elevated temperatures. Also, factors such as the velocity of flow of the vapor or liquid in contact with the ferrous metal to be protected come into consideration, as is known in this art. The upper concentration of the corrosive acid may be as high as 20 percent by weight in liquid phase and 20 volume percent in vapor phase.

Similarly, the oxygen content of the corrosive medium may vary, and generally the greatest corrosion rate is experienced with the maximum amount of oxygen present in accordance with its solubility under the existing conditions. Under some circumstances, the amount of oxygen may be quite low, in the order of .001 weight percent, and still cause considerable corrision due to constant replacement of the acid medium through flow of the vapors or liquid in contact with the ferrous metal.

Likewise, the temperature influences the rate of corrosion considerably and the additives of this invention are effective at low temperatures, in the order of 0° C. to as high as 200° C. Maximum effectiveness is obtained in combatting corrosion of aqueous inorganic acid solutions having concentrations of about 5 to 20 weight percent of acid at room temperature with oxygen being present at maximum amount soluble under these conditions.

The embodiments of the invention in which an exclusive property or privilege is claimed are described as follows.

I claim:
1. The method of protecting ferrous metals from corrosion in acidic media consisting of water containing about .01% to 20% by wt. of mineral acid which comprises maintaining in said acidic media about 0.01% by weight of a compound of the formula

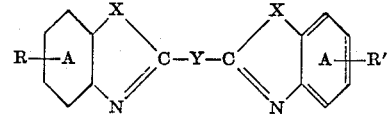

wherein R and R' are substituents of the group consisting of hydrogen, $C_1$ to $C_{20}$ alkyl radicals, $C_1$ to $C_{20}$ alkoxy radicals and $C_6$ to $C_{18}$ aryloxy radicals, X is a substituent of the group consisting of sulfur and imino, Y is a substituent of the group consisting of a divalent polyalkanol of the formula

where $n$ is 1 to 10, a divalent $C_1$ to $C_{20}$ alkylene group, and a divalent $C_6$ to $C_{14}$ arylene group and

represents an aryl group of 6 to 14 cyclic carbon atoms.

2. The method of preventing the corrosion of ferrous metals in contact with an aqueous solution containing about .01% to 20% by weight of hydrochloric acid which comprises maintaining about 0.1 weight percent of 1,2-bis(2-benzothiazolyl)ethane-1,2-diol in said aqueous solution.

3. An acidic composition, non-corrosive to metal surfaces in contact therewith, consisting essentially of water containing about .01% to 20% by wt. of mineral acid and as the sole corrosion-inhibiting component about 0.1 wt. percent of a compound of the formula

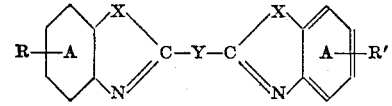

wherein R and R' are substituents of the group consisting of hydrogen, $C_1$ to $C_{20}$ alkyl radicals, $C_1$ to $C_{20}$ alkoxy radicals and $C_6$ to $C_{18}$ aryloxy radicals, X is a substituent of the group consisting of sulfur and imino, Y is a substituent of the group consisting of a divalent polyalkanol of the formula

where $n$ is 1 to 10, a divalent $C_1$ to $C_{20}$ alkylene group, and a diavlent $C_6$ to $C_{14}$ arylene group and

represents an aryl group of 6 to 14 cyclic carbon atoms.

4. An acidic composition, non-corrosive to ferrous metal surfaces in contact therewith, consisting essentially of an aqueous solution containing about .01% to 20% by weight of hydrochloric acid and about 0.1 weight percent of 1,4-bis(2-benzimidazolyl)butane.

5. An acidic composition, non-corrosive to ferrous metal surfaces in contact therewith, consisting essentially of an aqueous solution containing about .01% to 20% by weight of hydrochloric acid and about 0.1 weight percent of 1,2-bis(2-benzothiazolyl)ethane-1,2-diol.

6. The method of preventing the corrosion of ferrous metals in contact with an aqueous solution containing about .01% to 20% by weight of hydrochloric acid which comprises maintaining about 0.1% by weight of 1,4-bis(2-benzimidazolyl)butane in said aqueous solution.

References Cited by the Examiner
UNITED STATES PATENTS

| | | | |
|---|---|---|---|
| 2,483,392 | 10/1949 | Meyer et al. | 260—304 XR |
| 2,832,735 | 4/1958 | Hughes | 252—8.55 |
| 2,985,661 | 5/1961 | Hein et al. | 260—304 XR |
| 3,105,837 | 10/1963 | Ursprung | 252—391 XR |

JULIUS GREENWALD, *Primary Examiner.*